United States Patent [19]

Nelson

[11] 4,108,154

[45] Aug. 22, 1978

[54] SOLAR ENERGY COLLECTION SYSTEM

[75] Inventor: David H. Nelson, Twentynine Palms, Calif.

[73] Assignees: Homer Van Dyke; Mark Dorian; Dave Van Dyke; George Lerg, ; part interest to each

[21] Appl. No.: 744,290

[22] Filed: Nov. 22, 1976

[51] Int. Cl.$^2$ .............................................. F24J 3/02
[52] U.S. Cl. ................... 126/270; 237/1 A; 248/123; 248/397; 250/203 R; 126/271
[58] Field of Search .............. 126/270, 271; 248/123, 248/397; 237/1 A; 250/203 R; 92/10; 188/269

[56] References Cited

U.S. PATENT DOCUMENTS

| | | | |
|---|---|---|---|
| 1,162,505 | 11/1915 | Nichols | 126/271 |
| 2,141,330 | 12/1938 | Abbot | 126/271 |
| 2,205,378 | 6/1940 | Abbot | 126/271 |
| 2,774,447 | 12/1956 | Bourcier de Carbon | 188/269 |
| 3,171,403 | 3/1965 | Drescher | 126/270 |
| 3,515,594 | 6/1970 | Samuels | 126/270 |
| 3,996,917 | 12/1976 | Trihey | 126/270 |
| 4,011,858 | 3/1977 | Hurkett | 126/271 |
| 4,030,716 | 6/1977 | Freitag | 188/269 |

Primary Examiner—John J. Camby
Assistant Examiner—Henry C. Yuen
Attorney, Agent, or Firm—Fulwider, Patton, Rieber, Lee & Utecht

[57] ABSTRACT

A solar energy collection system is provided in which a parabolic trough is oriented by a drive mechanism to reflect the rays of the sun onto an energy collector located at the parabolic focus. The system is constructed to track the sun to maintain focusing of reflected solar radiation during daylight hours. A counterweight is employed in association with the drive mechanism to effectuate tracking and to maintain gravitational equilibrium of the reflector trough despite changes in elevation of the center of the gravity of the trough. Shock absorbers are provided which inhibit disorientation of the trough by gusts of wind, yet which allow the trough to track the sun. Coaxial construction of the solar energy collector with an evacuated sleeve of parabolic configuration positioned thereabout allows a heat collection medium to circulate in the collector, yet minimizes radiant heat loss. The trough is selectively inclined at an angle relative to the earth's surface in accordance with the latitude of the location of the trough and the azimuth of the sun above the earth's horizon.

31 Claims, 18 Drawing Figures

SOLAR ENERGY COLLECTION SYSTEM

FIELD OF THE INVENTION

The present invention relates to the collection and concentration of solar energy utilizing a reflector that reflects and focuses solar radiation onto a solar energy collector.

BACKGROUND OF THE INVENTION

Various systems have been developed in the past for the purpose of attempting to capture solar energy for use. Many conventional systems employ one or more longitudinally extending reflector troughs. These troughs may be of parabolic cross section or configuration. Solar energy is reflected from the interior concave reflective surfaces of the trough for focusing onto a linearly extending solar energy collector.

In prior art systems the desireablity of maintaining the trough in proper orientation relative to the position of the sun overhead has been recognized. Proper orientation should be maintained in accordance with the latitude location of the solar energy collection device on the earth's surface and in accordance with the azimuth position of the sun in the sky. Even more important, however, is the proper orientation of the reflector device in accordance with the relative movement of the sun from east to west with respect to the earth's surface. All conventional systems heretofore employed, however, have been significantly deficient in one or more respects. In those systems where manual orientation is suggested, the practical effect is that the reflector is seldom properly focused, since the lapse of a few moments between adjustment results in a marked decrease in effeciency of energy collection. Electro mechanical systems heretofore employed have maintained proper orientation, but only with an inordinate consumption of energy in the process. For example, one half and three quarter horsepower motors have been employed to rotate the reflector dishes or troughs of conventional systems. The amount of energy necessary to effect this rotation detracts significantly from the net energy output achieved using conventional solar collection systems of this type.

Accordingly, it is a principal object of the present invention to significantly reduce the energy consumption required to maintain proper reflector orientation. This is achieved by employing a counterweight in association with the reflector trough to allow the greatest burden of necessary energy consumption in reflector orientation to be provided by the force of gravity, which maintains the reflector system in gravitational equilibruim. In conventional solar energy concentration systems a significant amount of force is required to properly orient the reflector because the center of gravity must be raised or lowered as the sun proceeds in its apparent movement across the sky. The required energy consumption is aggravated with increased size of collector systems which are necessary in order to provide a sufficient energy output to justify the initial cost and maintenance of a solar energy collection system. By employing the counterweight in the manner described according to the present invention, however, gravitational equilibruim of the system is maintained, and only a small amount of energy is required to effect orientation of the reflector to track the sun. It is estimated by providing the tracking system of the invention to conventional solar energy absorbtion systems, an increase in energy output of 30% is practical.

A further object of the invention is to provide a means for maintaining proper orientation of the reflector by preventing wind and wind gusts from disorienting the alignment of the reflector trough. This is achieved by the use of shock absorbers connected between the reflector trough and its supports. The shock absorbers allow the trough to rotate slowly to track the sun, but prevent sudden reorientation as would otherwise result from wind gusts.

A further object of the invention is to provide a longitudinally extending reflector trough designed for alignment along a North South axis with provision for adjustment of elevation of at least one end of the trough. A support or framework is provided having upright stanchions at either end. The length of the stanchions at at least one end are adjustable so that the collection mechanism may be positioned to maximize the collection of solar energy depending upon the latitude at which the mechanism is located and the azimuth of the sun above the horizon. The lower extremities of the shock absorbers are attached to the frame and may be selectively secured to the frame at different longitudinal positions therealong. Thus, the shock absorbers are always aligned at a right angle with respect to the axis of reflector rotation, regardless of the longitudinal pitch of the reflector trough. Similarly, universal joints are used at either end of the trough to couple the trough for rotation relative to the stachions.

Another object of the invention is to provide a collector tube which maximizes the efficiency of reflected solar radiation collection and retention. This is achieved by providing coaxial tubes for the circulating fluid used to collect the reflected solar energy. Thus, the fluid may flow through the innermost tube from one end of the trough to the other, and then back around the outside of that innermost tube within a second outer coaxial tube. Alternatively, flow may proceed in the opposite direction. In both instances heat radiated from the inner tube is thereby absorbed by fluid in the outer tube. In addition, an evacuated coaxial sleeve may be provided around the outer tube. The vacuum therein reduces radiation outward from the outer tube. Preferably, the sleeve is shaped with a semi-circular configuration on its lower surface to match the parabolic configuration of the reflector trough. Reflected radiation thereby penetrates the sleeve from the trough normal to the surface of the sleeve. The top or upper surface of the sleeve, on the other hand, is flat, thereby reducing the volume of circulating fluid to increase the volumetric concentration of solar energy in the fluid. This raises the temperature of the fluid so that thermal energy may be extracted therefrom more efficiently.

A further object of the invention, especially as applied to plate collectors, is to obtain an advantage in facilitating maintenance. In conventional systems, rectangular collectors are packed side by side in a fixed rectilinear array. Consequently, a defect in an interiorally located panel is extremely difficult to reach and service. Using the tracking and orientation system of the present invention panels need merely be tilted on edge to provide a passageway for access to the interior panels.

DETAILED DESCRIPTION OF THE PREFERRED EMBODIMENT

Figures 1, 2, 3, 5, 6, 8, 9:
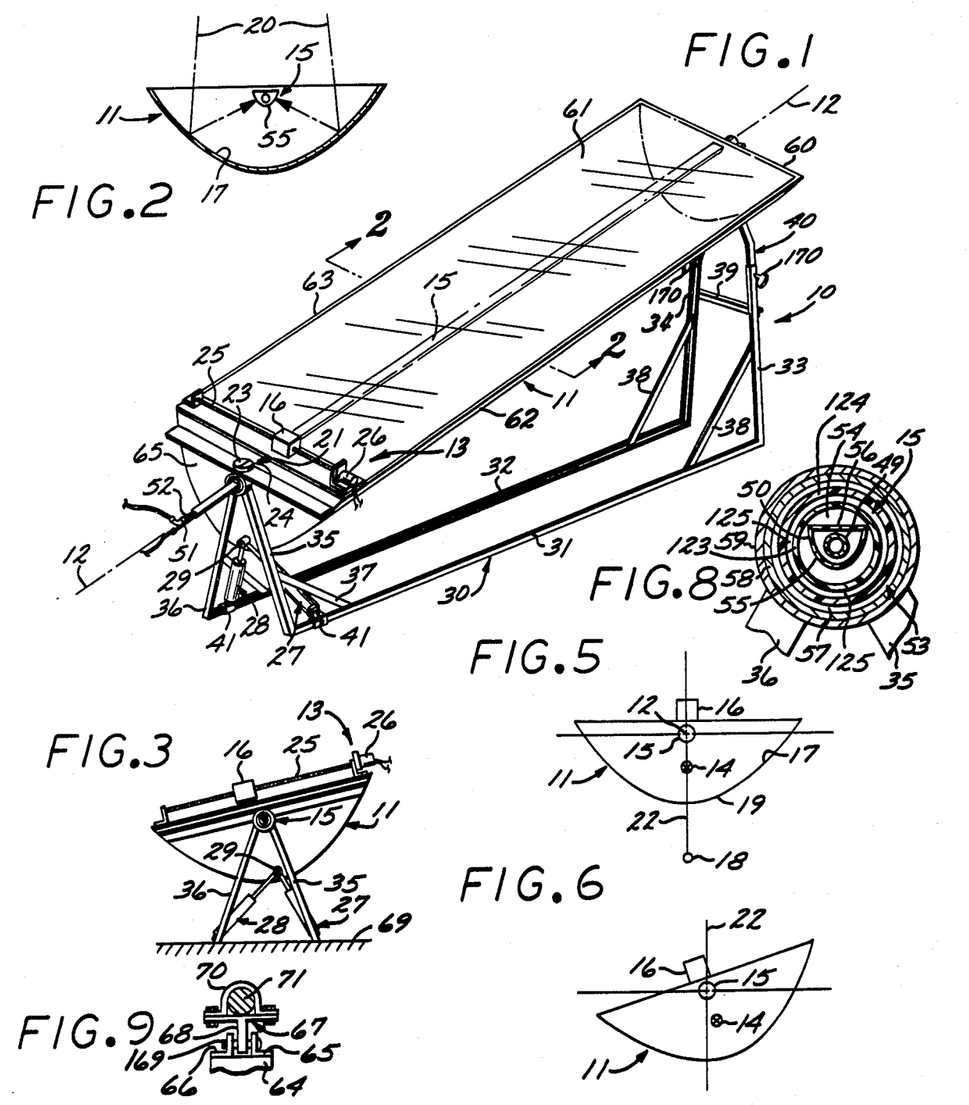
FIG. 1 is a perspective view of a preferred embodiment of the solar energy collection mechanism of the present invention.
FIG. 2 is a cross sectional view of the reflector trough and collection means taken along the lines 2—2 of FIG. 1
FIG. 3 is an elevational view of the lower end of the solar energy collection mechanism of FIG. 1.
FIGS. 5, 6 and 7 are diagramatic views illustrating the orientation of the reflector trough and the counterweight to effectuate rotation of the reflector trough in gravational equilibruim.
FIG. 8 is a detail view of the collector and axle construction at the lower end of the device of FIG. 1.
FIG. 9 is an elevational detail of a universal joint useful in the invention.
Figure 7:
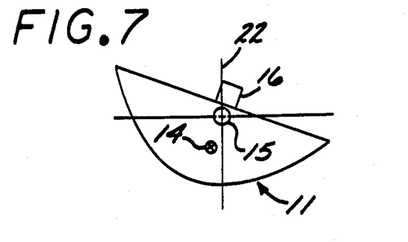

Referring now to FIG. 1, a solar energy collection mechanism is depicted at 10 in which a reflector trough 11 is mounted to rotate about an axis 12 under the control of a drive mechanism 13. The elevation of the center of gravity of the trough, indicated at 14 in FIGS. 5, 6 and 7, is thereby varied to maintain reflected rays of the sun in focus on the solar energy collection means 15. A counterweight 16 is mounted on the trough 11 and is laterally movable relative to the center of gravity 14 of the trough 11. The movement of the counterweight 16 maintains the trough in gravitational equilibruim and serves to rotate the trough 14 in an arc about the axis 12 to orient the trough 14 to reflect the rays of the sun in focus upon the collector 15.

The solar energy reflection trough 11 is formed with a smooth uniform concave ruled surface 17 of parabolic cross section and having a mirror finish of silvered glass, aluminum, stainless steel or other highly reflective material. The surface 17 is defined such that the locus of a straight or ruled line that is parallel to the axis 12 and travels in contact with the surface 17 proceeds in a parabolic path. The parabolic configuration of the surface 17 is illustrated in FIGS. 2, 5, 6 and 7, and is uniform throughout the length of the trough 11. All points on the parabolic configuration of the surface 17 are equidistant from the focus, which is the axis 12, and from the directrix, which is indicated at 18 in FIG. 5. The vertex of the parobala is indicated at 19 in FIG. 5 and is halfway between the focus 12 and the directrix 18. The trough 11 is equipped with planar end panels 60 and 65 perpendicular to the axis 12. The concave surface 17 terminates in flanges 62 and 63 extending outward at the upper extremities of the trough 11 remote from the directrix 18. The flanges 62 and 63 lie in a plane perpendicular to a plane containing the axis 12 and the vertex 19.

It is to be understood that the geometry of the reflection trough 11 is discussed herein largely in terms of the plane projection, of the surface 17 and collector 15, as indicated in FIGS. 2, 5, 6 and 7 for the sake of simplicity. It is apparent from FIG. 1, however, that the reflection trough 11 is a three dimensional object and that the directrixs 18 and vertex 19 are merely planar projections of straight lines parallel to the axis 12.

By virtue of the construction of the reflection trough 11, the center of gravity 14 is usually located between the axis 12 and the vertex 19. Thus, the center of gravity 14 will lie nearest the earth when the reflection trough 11 is oriented in the position of FIG. 5. The reflection trough would be in this position to properly reflect the rays 20 of the sun in focus on the linear collector 15 when the sun is midway between the east and west horizons. To properly orient the reflection trough 11 in any other position, such as the positions of FIGS. 6 and 7, the center of gravity 14 must be raised. In large reflection troughs this requires a considerable amount of energy. For example, using a reflector 11 of only moderate size, such as 5½ feet in breadth across the upper edges of the end panels 60 and 65 and 10 feet in length, the trough may weigh from 40 to 60 pounds. To properly orient such a trough 11 to properly catch the first rays of the morning sun, the center of gravity 14 must be moved into the same horizontal plane as the axis 12. This represents an expenditure of approximately 40 to 60 foot pounds of energy which is provided in conventional systems with a ½ or ¾ horsepower motor. By employing the counterweight 16 of the present invention, however, the same orientation can be achieved with merely a 0.01 horsepower motor that draws 0.34 amperes of current. The effect is to markedly increase the net output of energy from the solar energy collection device 10 by reducing the amount the energy required to orient the reflection surface 17.

The solar energy collection device 10 is provided with a photodetection unit 21 oriented flat on a plane parallel to the axis 12 and normal to the principal axis 22 of the parabolic configuration. The photodetection unit 21 includes a pair of matched photosensors, one positioned in each of two adjacent compartments 23 and 24. The output of the photosensors are compared in conventional analog logic circuitry and the differential of outputs is used to actuate the drive mechanism 13 to maintain the rays 20 reflected from the concave surface 17 in focus upon the collector 15 and to maintain the trough 11 and collector 15 in gravitational equilibruim.

The differential output of the photodetection unit 21 is transmitted to the drive mechanism 13 which includes a reversible electric motor 26 coupled to a worm drive 25. The counterweight 16 is engaged with the worm drive 25 and is longitudinally movable in a linear path lying in a plane perpendicular to the principal axis 22 of the parabolic configuration of the surface 17. The motor 26 is reversible, so that an output from the photodetector in the compartment 23 greater than that in compartment 24 will drive the motor 26 in one direction, while predominance of the output from compartment 24 will drive the motor 26 in the opposite direction. The motor is driven in a direction to equalize the outputs of the matched photodetectors. Consequently, in the early daylight hours if FIG. 7 is considered to be a view looking north at the end of the reflection trough 11, it is desireable to drive counterweight 16 to the right of the principal axis 22 as indicated. The leverage which the weight of the counterweight 16 exerts as it center departs from the principal axis 22 exerts a moment of torque opposite to the moment exerted by the center of gravity 14 of the trough The weight of counterweight 16 is selected so that these moments will be equal at the desired orientation. The moment exerted by the center of gravity 14 is counteracted by the weight of counterweight 16.

From the position of FIG. 7, which would occur in the morning of a day, the motor 26 would be acuated to slowly move the counterweight 16 to the left until the sun is midway between the east and west horizons. The reflection trough 11 would then be oriented in the position of 5. As the sun continued its relative movement to the west, the counterweight 16 would be driven still further to the left to continue to counteract the moment exerted at the center of gravity 14 of the trough 11 and collector tube 15, as depicted in FIG. 6. Throughout the orientation of the reflection trough 11, the counterweight 16 is aligned and driven for lateral movement along the linear path of the worm gear 25 which lies in a plane perpendicular to the principal axis 22 of the parabolic configuration.

The solar energy collection device 10 includes a supporting frame 30 having laterally separated longitudinal rails 31 and 32. Upright stanchions 33, 34 and 35, 36 extend from the ends of the rails 31 and 32 as indicated. Braces 37 and 38 at either end of the support provide rigidity to the frame 30, as does the cross brace 39 at the elevated end of the support. The stanchions 33 and 34 converge into a single post 64, wich is coupled to the elevated end of the trough 11. The stanchions 35 and 36 converge and are coupled to a bearing 59 at the low end of the trough. Axles extend from both ends of the trough coaxial with the axis 12 and are journal into bearings.

The upright stanchions 33 and 34 are adjustable in length to vary the longitudinal orientation of the trough 11 relative to the surface of the earth. That is, the stanchions 33 and 34 each include telescoping sections that may be secured to each other at different elevations by locking pins 40. Each pair of stanchions is coupled to the associated axle along axis 12 through a universal joint depicted in FIG. 9.

One embodiment of an appropriate universal joint is depicted in FIG. 9. In this embodiment, the upper extremities of th stanchions 33 and 34 terminate in a single upward extending post 64. To the upper extremity of this post are affixed two angles, 65 and 66. A T-shaped member 67 is provided with a leg 68 of the T extending parallel to and between the upward extending legs of the angles 65 and 66. A single pin 169 extends through the upwardly extending legs of the angles 65 and 66 and through the downwardly extending leg 68 of the T-shape member 67 to form a pivot axis. A bracket 70 encircles the axis 71 extending outward from the end panel 60 of trough 11 along the axis 12. The axle 71 rides sufficiently loose, or with the aid of a bearing race within the bracket 70, however, as it must be free to turn relative thereto. In this way, the orientation of the T-shaped member relative to the post 64 may be altered. That is, the T-shaped member may be rotated into or out of the plane of FIG. 9 in order to accomodate adjustments of the telescoping sections of the legs 33 and 34. Adjustment of the telescoping sections of the legs 33 and 34 is performed by means of set screws 170, which are threadably engaged in the outer telescoping section of each leg and which can be turned by hand by means of flanges to clamp the inner section in place. Thus, the axle 71 does not bind within the bracket 70, and is not restrained from moving relative thereto regardless of the degree of elevation of the upper end of the trough 11.

A further feature of the preferred embodiment of the invention includes the provision of shock absorbers 27 and 28 which are connected between the surface of the earth, indicated at 69 in FIG. 3, and the trough 11. The shock absorbers 27 and 28 are coupled to the trough 11 at a common longitudinally projecting junction pin 29 which is displaced from the axis 12. The shock absorbers 27 and 28 are connected at their lower ends respectively to rails 31 and 32, and are selectively secured to their associated rails at different longitudinal positions therealong by means of conventional clamps 41. Thus, when the latching pins 40 are adjusted to change the elevation of the upper end of the trough 11, the clamps 41 should be similarly loosened so that the lower ends of the shock absorbers 27 and 28 may be moved along the rails 31 and 32. In this way the orientation of the shock absorbers 27 and 28 may be maintained so that they are always perpendicular to the projecting pin 29 which in turn is parallel to the axis 12. This prevents the shock absorbers from binding or locking as a result of misorientation.

Figure 4:
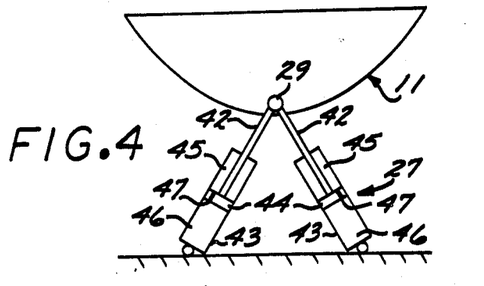
FIG. 4 is a diagramatic view illustrating the operation of the wind gust control mechanism of the invention.

The operation of the shock absorbers is depicted in FIG. 4. It should be noted that each of the shock absorbers 27 and 28 includes a piston rod 42, and a cylinder 43. Both of the shock absorbers 27 and 28 are divided by a piston 44 at the end of the piston rod 42 into two chambers 45 and 46. The piston 44 in each instance includes an orifice 47 through which hydraulic fluid in the chambers 45 and 46 can flow, but only at a very slow rate. Thus, sudden gusts of wind from either the east or west will be met by substantial resistance provided by the shock absorbers 27 and 28. However, operation of the motor 26 to rotate the reflector trough 11 is not inhibited by the shock absorbers 27 and 28 because of the slow rate of rotation of the trough. The rotation of the trough 11 is at a slow enough rate so that even the narrow orifices 47 are adequate to allow the requisite amount of fluid to be transferred from one chamber of the shock absorbers to the other. The reflection trough 11 is thereby able to resist the forces of sudden gusts of wind that would otherwise disrupt its orientation. Such wind gusts are extremely common in desert areas where solar energy collection devices, such as the device 10, find their greatest applicability.

A further feature of the invention is the design of the linear collector 15 which is depicted in detail in FIG. 8. A first inner copper tube 49 is provided to carry fluid from one end of the trough 11 to the other along the axis 12. A second copper tube 50 is coaxially positioned about the first tube 49 and is in communication therewith at a single end of the trough, preferably the elevated end. Thus, the tube 49 carries a heat collection medium, such as water, in a first longitudinal direction up and to the right in FIG. 1. The semi-circular outer tube 50 carries the fluid back along the outside of the inner tube 49 in an opposite longitudinal direction. The outer tube 50 has a lower semi-circular surface 55 facing the uniform concave surface 17 of the trough 11. Thus, solar rays 20 are reflected perpendicularly from a tangent to the parabolic surface 17 and strike the surface 55 likewise substantially perpendicular to a tangent to that surface since all of the reflected rays 20 focus on the axis 12. The outer tube 50 also has an opposing flat upper surface 56 parallel to the directrix 18 of the parabolic configuration of the trough 11. The flat upper surface 56 minimizes the volume of fluid entrapped therein, thereby maximizing the heat collected per unit volume. Relatively cool fluid enters the central inner tube 49 through an axial inlet port 51 and is withdrawn through an outlet port 52 in communication with the second or outer tube 50. Alternatively, fluid could be introduced through the port 52 and circulate through the outer tube 50 before entering the inner tube 49 at the elevated end of the trough 11. The fluid would then be withdrawn through the port 51.

In addition to the two tubes for circulating the heat collection medium, a vacuum jacket 53 is provided and coaxially positioned externally about the tube 50 to minimize radiant heat lost therefrom. The volumetric area indicated at 54 is a dead air space surrounded by an inner glass sleeve 123. An outer glass sleeve 124 is coaxially positioned about the inner sleeve 123. Between the two sleeves is an annular evacuated volume 125. The sleeves 123 and 124 converge together at one end, preferably the elevated end of the trough 11. An airtight rubber seal separates the sleeves 123 and 124 at the other end to maintain the vacuum therebetween, yet is flexible enough to accomodate the different thermal expansion characteristics of the copper tubes 49 and 50 and the glass sleeves 73 and 74.

The benefit derived from the collector tube configuration depicted in FIG. 8 is that while radiant energy entering the semi-cylindrical surface 55 of the outer tube 50 is maximized, by striking the surface at substantially a 90° angle, the radiant energy, once transmitted to the heat collection fluid within the tubes 50 and 49, is entrapped therein. That is, thermal energy is radiated from the heat collection fluid in the outer tube 50 through the dead air space 54 to only a slight degree and with great difficulty. To the contrary heat radiated from the inner tube 49 is absorbed in the outer tube 50, thus further minimizing overall heat loss in the fluid circulating flow through the tubes 49 and 50.

The linear collector 15 is held in position by felt packing 57 which conforms to the outer surface of the sleeve 124. The felt packing 57 thereby enables the collector 15 to be centrally located within a bearing race 58 and coaxial thereto. The bearing race 58 and the collector 15 in FIG. 8 rotate in synchronism with the reflector trough 11. The bearing race 58 is carried in a bearing housing 59 which is welded to the upper extremities of stanchions 35 and 36 at the lower end of the solar energy collection mechanism. A similar bearing assembly is employed at the upper or elevated end of the trough 11, but it is to be understood that the tubes 49 and 50 do not extend through the end wall 60 of the elevated end, but rather terminate interiorially with respect thereto.

A laminar transparent shield 61 of lexan or other suitable memebrane material is stretched across the upper breadth of the trough 11. The shield 61 is attached to the trough 11 along the laterally extending ledges 62 and 63. Thus, sand, dust, and other debris are precluded from entering the concave surface of the trough 11 and interfering with the reflective capability of the surface 17. In addition, the membrane 61 encloses the collector 15 and thereby surrounds the collector 15 in a hot ambient environment since heat that is developed within the trough 11 is trapped therein. This serves to minimize still further the heat loss from the collector 15.

Figure 10:
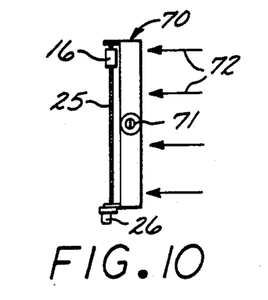
FIG. 10 illustrates the orientation of another embodiment of the invention at dawn.
Figure 11:
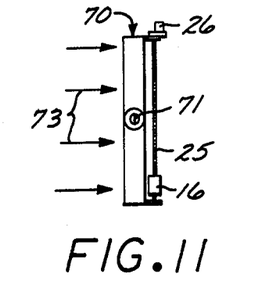
FIG. 11 illustrates the orientation of the embodiment of FIG. 10 at dusk.
Figure 12:
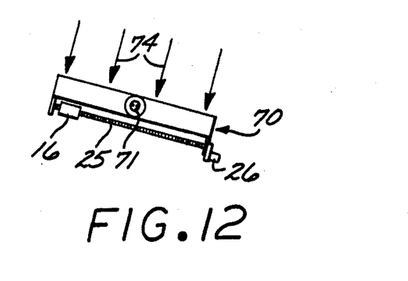
FIG. 12 illustrates the orientation of the embodiment of FIG. 10 at an intermediate time.

The orientation arrangement for solar energy collection systems according to the invention has application other than with parabolic reflectors. An example of one such other application is depicted in FIGS. 10, 11 and 12 in which the orientation of a plate collector is illustrated. Plate collector solar energy absorbing panels are presently used to a greater commercial extent than are parabolic or other concave solar collection devices. One exemplary form of plate collector is the Sunstream solar water heating system collector, sold in the Sunstream Solar Water Heating System Kit, model 50, by Grumman Houston, Inc., of Bethpage, N.Y.

In the application of the orientation system of the invention to a solar energy collection system utilizing a plate collector 70, the plate collector 70 is mounted to rotate about a longitudinal axis 71. The axis 71 is aligned longitudinally, that is in a north south direction. The center of weight acting upon the solar energy absorbing structure 70 is arranged in transverse displacement from the axis 71 to impart a rotational moment to the absorbing structure 70 tending to turn the structrue 70 from an orientation facing east to an orientation facing west. In the embodiment illustrated, the offset in the center of weight is produced by the same counterweight 16 depicted in association with the parabolic reflector 11. The counterweight 16 is mounted on a transverse guide, which may be the worm shaft drive 25. The motor 26 likewise may be used to drive the counterweight 16 along the shaft 25.

In FIG. 10, the plate collector 70 is viewed looking from the south toward the north at the axis 71. At dawn rays 72 from the sun strike the plate collector from the east, preferably at an angle nearly perpendicular to the planar face of the plate collector 70. Although maintained in a near vertical position as depicted in FIG. 10 at dawn by the rotation restraining means to be described, the weight 16 acting downward to the left of the axis 71 produces a counterclockwise moment tending to rotate the energy absorbing face of the plate collector 70 to the position depicted in FIG. 11. Ideally, this is the position which the plate collector 70 should assume at dusk when the rays 73 from the sun come from the west and the weight 16 has caused the plate collector 70 to rotate to the stable position of FIG. 11. However, it is the purpose of the orientation system to maintain the energy absorbing structure in a position so that the rays of the sun strike its sensitive surfaces at a near normal angle or at an angle designed to concentrate the power absorbed. For example, the relative rotation of the plate collector 70 about the axis 71 in FIG. 12 is the desired position which the collector 70 should assume at about 11 am. In this position, the rays 74 of the sun strike the sensitive surface of the plate collector 70 nearly perpendicularly. The weight 16 continues to exert a counterclockwise force on the plate collector 70, but a rotation restraining means is provided to resist that moment and to arrest rotation of the plate collector 70 from its initial position facing east, depicted in FIG. 10 to its final position facing west, depicted in FIG. 11.

Figures 13, 14:
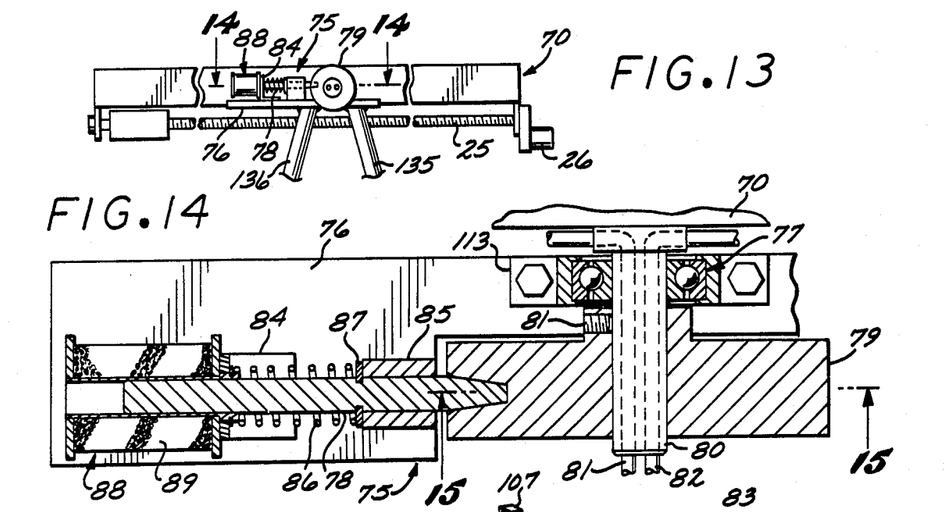
FIG. 13 is an end view illustrating the rotation restraining and control mechanisms of the embodiment of FIG. 10.
FIG. 14 is an enlarged sectional view taken along the lines 14—14 of FIG. 13.

The rotation restraining means is illustrated at 75 in FIG. 13. In the arrangement of FIG. 13, the plate collector 70 is supported by upright standards 135 and 136. These standards terminate in a platform 76, atop which are secured bearing assemblies and races indicated generally 77 of the type heretofore described and a C-shaped restraining bracket 118. The rotation restraining means 75 consists of two major elements, a bolt 78 and a latch plate 79, which together resist the counterclockwise moment provided by the counterweight 16 in the positions of FIGS. 10 and 12 to arrest rotation from east- facing to west-facing orientation. The latch plate 79 has a central aperture through which an axial shaft 80 passes. The rotation of shaft 80 relative to the platform 76 is facilitated by the bearing assembly 77, depicted in FIG. 14. The latch plate 79 is keyed or fastened to move in rotation with the plate collector 70 by virtue of a set screw 81. Set screw 81 rigidly secures the planar disk or latch plate 79 to the shaft 80, which in turn is connected to the solar collector 70. Heat transfer medium tubes 81 and 82 pass through the shaft 80 and are connected to heat transfer elements of the plate collector 70.

Figures 15, 16, 17, 18:
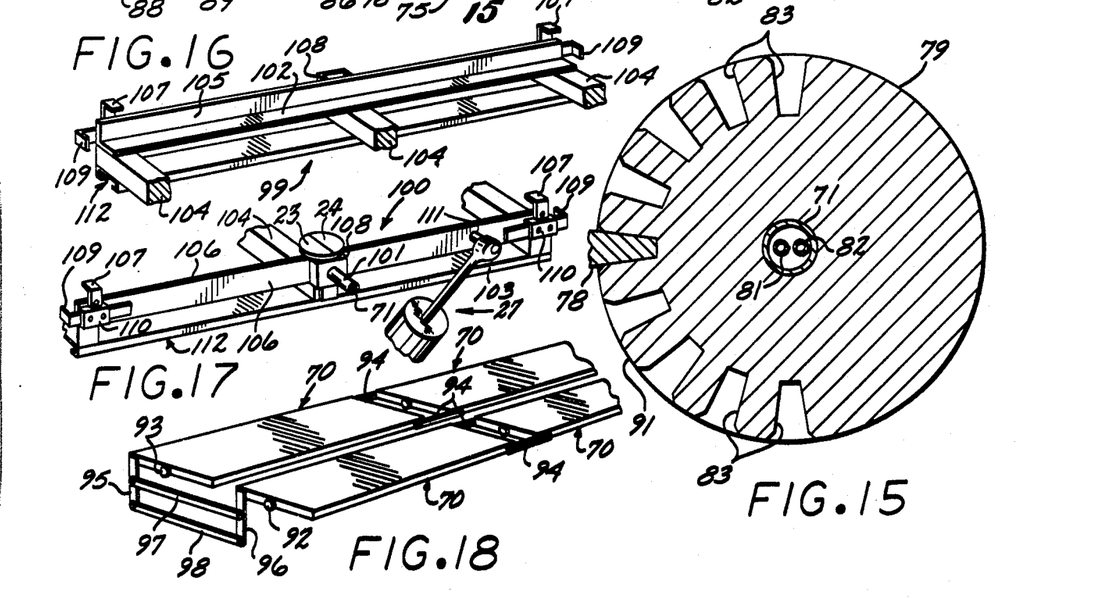
FIG. 15 is an isolated sectional view taken along the lines 15—15 of FIG. 14.
FIG. 16 is a perspective interior view of a bracket according to the invention.
FIG. 17 is a perspective exterior view of a bracket according to the invention.
FIG. 18 is a perspective view illustrating tandem operation of solar energy obsorbng panels according to the invention.

A plurality of discrete sockets 83 are defined in an arcuate array about the axis 71 as depicted in FIG. 15. Since the latch plate 79 is fastened to rotate with the collector panel 70, each of the sockets 83 corresponds to a desired attitude of orientation for a particular time of solar day.

An angle 84 is welded to the platform 76 and is designed to carry the bolt 78 which passes through a circular aperture therein. The bolt 78 is slidably moveable into selective engagement with any one of the sockets 83 that is proximately aligned therewith as the absorbing structure 70 rotates to different attitudes of rotation relative to the bolt 78. A guide angle 85 carries the forward portion of the bolt 78 so that the bolt 78 is radially directed towards the latch plate 79. A biasing device in the form of a compressed coil spring 86 acts upon a collar 87 fastened to the bolt 78 to urge the bolt 78 into engagement with an aligned socket 83 in the latch plate 79.

A control device 88 is provided for the purpose for allowing the weight acting upon the structure 70 to overcome the rotation restraining means to allow controlled rotation of the absorbing panel 70 from an east-facing to a west facing orientation. The control device 88 includes an actuating means, such as a solenoid coil 89 positioned concentrically about the bolt 78. The solenoid coil 89 may be pulsed to periodically overcome the force of the coil spring 86 to momentarily withdraw the bolt 78 from a socket 83, thereby allowing the weight of the counterweight 16 to carry the absorption means in counterclockwise rotation. The solenoid coil is pulsed only momentarily, so that the bolt 78 is withdrawn only long enough to allow the latch plate 79 to shift in attitude to prevent the bolt 78 from re-engaging the same socket 83. The bolt 78 then rides along the outer surface 91 of the latch plate 79 until it is aligned with the next sequential socket 83, whereupon it engages that socket. At this point, the structure 70 is in a different attitude relative to the bolt 78 than it was prior to pulsing of the solenoid coil 89. That is, the latch plate 79 has rotated one incremental unit in a counterclockwise direction, the incremental unit corresponding to the distance between adjacent sockets 83.

The solenoid 89 may be pulsed periodically by a timer, or it may be subjected to the influence of a differential photosensor, such as the photodetection unit 21 described in connection with the parabolic reflector 11. In this latter instance, a predetermined differential output from the two matched photosensors in the compartments 23 and 24 would be required before the solenoid 89 would be pulsed.

It is to be understood that while the embodiment depicted employs a planar latch plate 79 rotable in association with the collector panel 70 while the bolt 78 undergoes no rotational motion, it should be readily apparent that the planar latch plate 79 could be mounted atop the upright supports 135 and 136 and that the bolt 78 could be carried on a platform attached to the collector panel 70.

In either event, the system would have to be reset at the end of a solar day. That is, once the collector panel 70 has rotated to the position of FIG. 11, the weight 16 will cause no further counterclockwise rotation. Thus, the weight 16 must either be driven up the worm driveshaft 25 by the motor 26 to flip the panel 70 over or altenatively a manual a manual reset system could be employed. In the manual arrangement, the panels 70 are merely reset sometime between darkness and dawn from the final position of FIG. 11 to the initial position of FIG. 10.

As a further feature of the invention, several panels 70 can be joined together to rotate synchronously in tandem. For example, different planar solar panels 70 are joined to rotate about different parallel axes 92 and 93 in FIG. 18. Longitudinally aligned panels are joined by connecting links 94 while laterally aligned panels 70 are joined together by parallelogram linkage including mutually parallel members 95 and 96 and opposing mutually parallel members 97 and 98. With this arrangement, the orienting mechanism of FIG. 13 need be applied to only one of the plate collectors 70, as the controlled rotation of one of the panels will cause all of the separate panels 70 to move together to assume a common orientation.

The application of the invention to commercially available plate collectors 70 is simplified by equipping the system with a cradle arrangement to receive a plate collector 70, as depicted in FIGS. 16 and 17. As illustrated, the cradle might well include opposing brackets 99 and 100 each having a shaft, such as 101, extending longitudinally outward from the center of the solar energy absorbing structure 70. It is to be understood, that the structure 70 would be carried between the brackets 99 and 100 and would rest on the shelves 102 and 103 respectfully extending longitudinally inward toward the center of the structure of the collector panel 70.

As can be noted, the shelves 102 and 103 are displaced from the axis of rotation of the panels 70. The axis 71 is centrally located with respect to the shaft 101, which is visible in FIG. 17. The shelves 102 and 103 thereby provide support to the collector panel 70. Wooden braces 104 provide the necessary rigidity to the shelves 102 and 103, and terminate in back panels 105 and 106 associated respectively with the brackets 99 and 100. Extending upward from each of the brackets are top end mounts 107 which vertically confine a plate collector 70 positioned within the brackets. The mounts 107 are adjustable in height.

Central upright channel sections 108 provide rigidity to the structure, and serve as points of attachment of the shafts of rotation such as the shaft 101 depicted. Lateral restraining devices, such as the lateral clamps 109 slide within sleeves 110 and may be adjustably secured therein to allow the brackets 99 and 100 accomodate plate collector solar absorption panels of varying width. The manner of attachment may be by virtue of a set screw engaged in the sleeves 110 and releasably fastenable to secure the lateral clamps 109 in the appropriate position.

Preferably, each of the brackets 99 and 100 includes a threaded aperture 111 in a back panel 105 or 106 which are attached to a woood brace 104. The aperture 111 is displaced from the shaft 101 to accomodate the installation of a shock absorber 27 which is attached by a threaded stud. The specific construction of the shock absorber 27 and the mounting system associated therewith are illustrated in FIGS. 1, 3 and 4. Such wind resistance systems find application in connection with plate collectors as well as with parabolic reflectors.

Aluminum guide channels 112 are secured to the undersides of the wood braces 104 to form convenient assemblies within which either the counterweight systems employing the counterweight 16 and the motor 26 may be accomodated, or within which some alternative weight system may be employed. In either event, the channel 112 serves as a transverse guide which accomodates the movement of a counterweight therealong.

It is to be understood that various other modifications and alterations of the basic concept of the invention will become readily apparent to those familiar with the concentration and collection of solar energy. Accordingly, the invention is not limited to the specific embodiments depicted in the drawings, but rather is defined in the claims appended hereto.

I claim:
1. In a solar energy collection mechanism in which a solar collector or a reflector trough is mounted upon a support to rotate about an axis under the control of a drive mechanism, thereby varying the elevation of the center of gravity of said collector or trough, to maintain reflected rays of the sun in focus on a solar energy collection means, the improvement comprising a transverse guide, "a counterweight mounted on said collector or trough and laterally movable along said transverse guide relative to said collector or trough to maintain said collector or trough in stabilized" gravitational equilibrium, and damping means connected between said solar collector or said reflector trough and said support to inhibit spurious rotation of said mechanism.

2. The solar energy collection mechanism of claim 1 further including a reflector trough and further characterized in that said support is immovably fixed to the earth, and said damping means is formed by shock absorber means connected to an attachment fixed with respect to the earth and connected to said trough and coupled to said trough at a location displaced from said axis.

3. The solar energy collection mechanism of claim 1 further including a reflector trough and further characterized in that said counterweight is aligned for lateral movement along a linear path lying in a plane perpendicular to a straight line extending between said center of gravity of said trough and said axis.

4. The solar energy collection mechanism of claim 1 further characterized in that said drive mechanism is a reversible electric motor coupled to a worm drive and said counterweight is engaged with said worm drive and longitudinally movable relative thereto.

5. The solar energy collection mechanism of claim 1 further including a reflector trough and further comprising a laminar transparent shield extending across the breadth of said trough, thereby enclosing said solar energy collection means.

6. The solar energy collection mechanism of claim 1 further including a reflector trough and further characterized in that said trough is formed with a uniform concave ruled surface of parabolic cross sectional configuration having planar end pieces perpendicular to said axis and having flanges extending outward at the extremities of said concave surface remote from the directrix of said parabolic configuration and perpendicular to a plane containing said axis and the vertex of said parabolic configuration.

7. A solar energy collection device comprising:
a support fixed with respect to the surface of the earth;
a solar energy reflection trough formed with a uniform concave ruled surface of parabolic cross section and mounted for rotation about an axis normal to the parabolic configuration and having a center of gravity located between said axis and the parabolic vertex;
linear collector means containing a circulating fluid heat collection medium aligned normal to the parabolic configuration and in coincidence with the parabolic focus,
a drive mechanism connected to said trough;
a transverse guide,
a counterweight mounted on said trough and operated by said drive mechanism to move along said transverse guide in a path perpendicular to said axis and through a plane extending through said parabolic vertex and said center of gravity to rotate said trough in an arc about said axis to orient said trough to reflect the rays of the sun in focus upon said collector means while maintaining said trough and collection means in gravitiational equilibrium, and damping means operatively connected between said collection plate and said support, to inhibit spurious rotation of said collector.

8. The solar energy collection device of claim 7 further characterized in that said damping means is comprised of a plurality of shock absorbers connected to said support at spatially displaced locations and to said trough at a common junction displaced from said axis.

9. The solar energy collection device of claim 8 further characterized in that each of said shock absorbers contains hydraulic fluid in a plurality of chambers separated by at least one orifice.

10. The solar energy collection device of claim 7 wherein said support comprises laterally separated longitudinal rails and upright stanchions at each end of each of said rails converge and are coupled to bearings at the ends of said trough into which axles extending from both ends of said trough along said axis are journaled, and the upright stanchions at at least one end of said trough are adjustable in length to vary the longitudinal orientation of said trough relative to the surface of the earth.

11. The solar energy collection device of claim 10 further characterized in that said stanchions are coupled to said axles through universal joints.

12. The solar energy collection device of claim 10 further comprising separate shock absorbers connected to different ones of said rails and to said trough at a common junction displaced from said axis and said shock absorbers are selectively secured to their associated rails at different longitudinal positions therealong.

13. The solar energy collection device of claim 7 further characterized in that said linear collector means is comprised of a first inner tube extending the length of said trough along said axis to carry fluid flow in a first longitudinal direction, and a second tube coaxially positioned about said first tube and in communication therewith at a single end of said trough to carry fluid flow along the outside of said inner tube in an opposite longitudinal direction.

14. The solar energy collection mechanism of claim 13 further comprising an evacuated sleeve coaxially positioned externally about said second tube to minimize radiant heat loss therefrom.

15. The solar energy collection device of claim 13 further characterized in that said second tube has a semicircular outer surface the curved portion of which faces said uniform concave surface of said trough, and an opposing flat portion of which is parallel to the directrix of said parabolic configuration.

16. The solar energy collection mechanism of claim 7 further characterized in that said linear collector means is coaxial with said axis.

17. The solar energy collection mechanism of claim 7 further comprising matched photosensors positioned in a plane normal to the principal axis of said parabolic configuration to actuate said drive mechanism to maintain the rays reflected from said concave surface in focus upon said collector means and to maintain said trough and collection means in gravitational equilibrium.

18. In a solar energy collection system in which a solar energy absorbing structure is mounted to rotate about a longitudinal axis to maintain an orientation to face the sun, the improvement wherein said absorbing structure includes a cradle means mounted upon said axis and arranged to receive a plate collector solar absorbtion panel, said cradle means comprises opposing brackets having a shaft extending longitudinally outward from the center of said solar energy absorbing structure for alignment along said axis, each having a shelf extending longitudinally inward toward the center of said structure and displaced from said axis to provide support to said structure, and each having lateral restraining means for restricting transverse movement of said panel relative to said axis and comprising a counterweight mounted on a transverse guide for movement therealong, whereby the center of weight acting upon said solar energy absorbing structure is arranged in transverse displacement from said axis to impart a rotational moment to said absorbing structure tending to turn said structure from an orientation facing east to an orientation facing west, and further comprising rotation restraining means for resisting said moment to arrest rotation from east facing to west facing orientation, and control means for allowing the weight acting upon said structure to overcome said rotation restraining means to allow controlled rotation of said absorbing structure from an east facing to a west facing orientation.

19. The system according to claim 18 wherein said lateral restraining means are adjustable to accomodate therebetween plate collector solar absorbtion panels of varying width.

20. The system according to claim 18 wherein rotation restraining means comprises a planar latch plate fastened to move in rotation with said solar energy absorbing structure and from which an axial shaft carrying said absorbing structure extends and in which a plurality of discrete sockets are defined in an arcuate array about said axis, and a bolt is mounted independent of rotational movement of said absorbing structure and is slideably movable into selective engagement with at least one socket proximately aligned therewith as said absorbing structure rotates to different attitudes of rotation relative to said bolt, and biasing means urges said bolt into engagement with an aligned socket in said latch plate, and wherein said control means comprises actuating means for periodically overcoming said biasing means to momentarily withdraw said bolt from a socket, thereby allowing said absorbtion means to rotate so that said biasing means causes said bolt to engage a different one of said sockets when said structure assumes a different attitude relative to said bolt.

21. The system of claim 20 further characterized in that said bolt is constructed of a ferrous material and said actuating means includes a solenoid coil positioned concentrically about said bolt.

22. The system according to claim 18 wherein said rotation restraining means comprises a planar latch plate through which an axial shaft carrying said absorbing structure passes and wherein a plurality of discrete sockets are defined in said latch plate in an arcuate array about said axis, and a bolt is mounted on and carried in rotation by said absorbing structure and is slideably movable into selective engagement with any socket proximately aligned therewith as said absorbing structure rotates to different attitudes of rotation relative to said latch plate, and biasing means urges said bolt into engagement with an aligned socket in said latch plate, and wherein said control means comprises actuating means for periodically overcoming said biasing means to momentarily withdraw said bolt from a socket, thereby allowing said absorbtion means to rotate so that said biasing means causes said bolt to engage a different one of said sockets when said structure assumes a different attitude relative to said latch plate.

23. The system of claim 18 further comprising a plurality of separate solar energy absorbing structures joined to rotate synchronously in tandem about different parallel longitudinal axes, whereby said separate structures all move in unison to assume a common orientation.

24. In a solar energy collection mechanism in which a solar radiation collector is mounted upon a support to rotate about an axis under the control of a drive mechanism, thereby maintaining an orientation facing the sun, the improvement comprising a transverse guide, and a counterweight mounted on said collector and laterally movable along said transverse guide relative thereto by said drive mechanism to maintain said collector in stabilized gravitational equilibrium throughout its rotation, and damping means connected between said collector and said support to inhibit spurious rotation of said collector.

25. The solar energy collection mechanism of claim 24 wherein said rotation damping means includes shock absorber means coupled between the earth and said collector at a location displaced from said axis.

26. The solar energy collection mechanism of claim 24 further characterized in that said drive mechanism is a reversible electric motor coupled to a worm drive and said counterweight is engaged with said worm drive and longitudinally movable relative thereto.

27. A solar energy collection device comprising:

a support fixed with respect to the surface of the earth;

a laterally expansive solar energy collection plate mounted for rotation about an axis aligned generally in a plane passing through the poles of the earth, linear collector means containing a circulating fluid heat collection medium lying within said collection plate, a drive mechanism connected to said collection plate, a transverse guide, a counterweight mounted on said collection plate operated by said drive mechanism to move along said transverse guide in a path perpendicular to said axis to rotate said collection plate in an arc about said axis to orient said collection plate to receive the rays of the sun normal thereto while maintaining said collection plate in stabilized gravitational equilibrium, and damping means operatively connected between said collection plate and said support, to inhibit spurious rotation of said collector.

28. The solar energy collection device of claim 27 wherein said damping means further comprises a plurality of shock absorbers connected to said support at spatially displaced locations and to said collection plate at connections laterally displaced from said axis.

29. The solar energy collection device of claim 28 further characterized in that each of said shock absorbers contains hydraulic fluid in a plurality of chambers separated by at least one orifice.

30. The solar energy collection mechanism of claim 27 further comprising matched photosensors positioned upon said collection plate to actuate said drive mechanism to maintain said collection plate in orientation normal to the rays of the sun and in gravitational equilibrium.

31. In a solar energy collection system in which a solar energy absorbing structure is mounted upon a support to rotate about a longitudinal axis to maintain an orientation to face the sun, the improvement wherein a counterweight acting upon said solar energy absorbing structure is shifted in transverse displacement from said axis along a transverse guide to impart a rotational moment to said absorbing structure tending to turn said structure to an orientation facing the sun, and rotation damping means connected between said solar energy absorbing structure and said support and arranged to suppress rapid rotation of said absorbing structure.

* * * * *